UNITED STATES PATENT OFFICE.

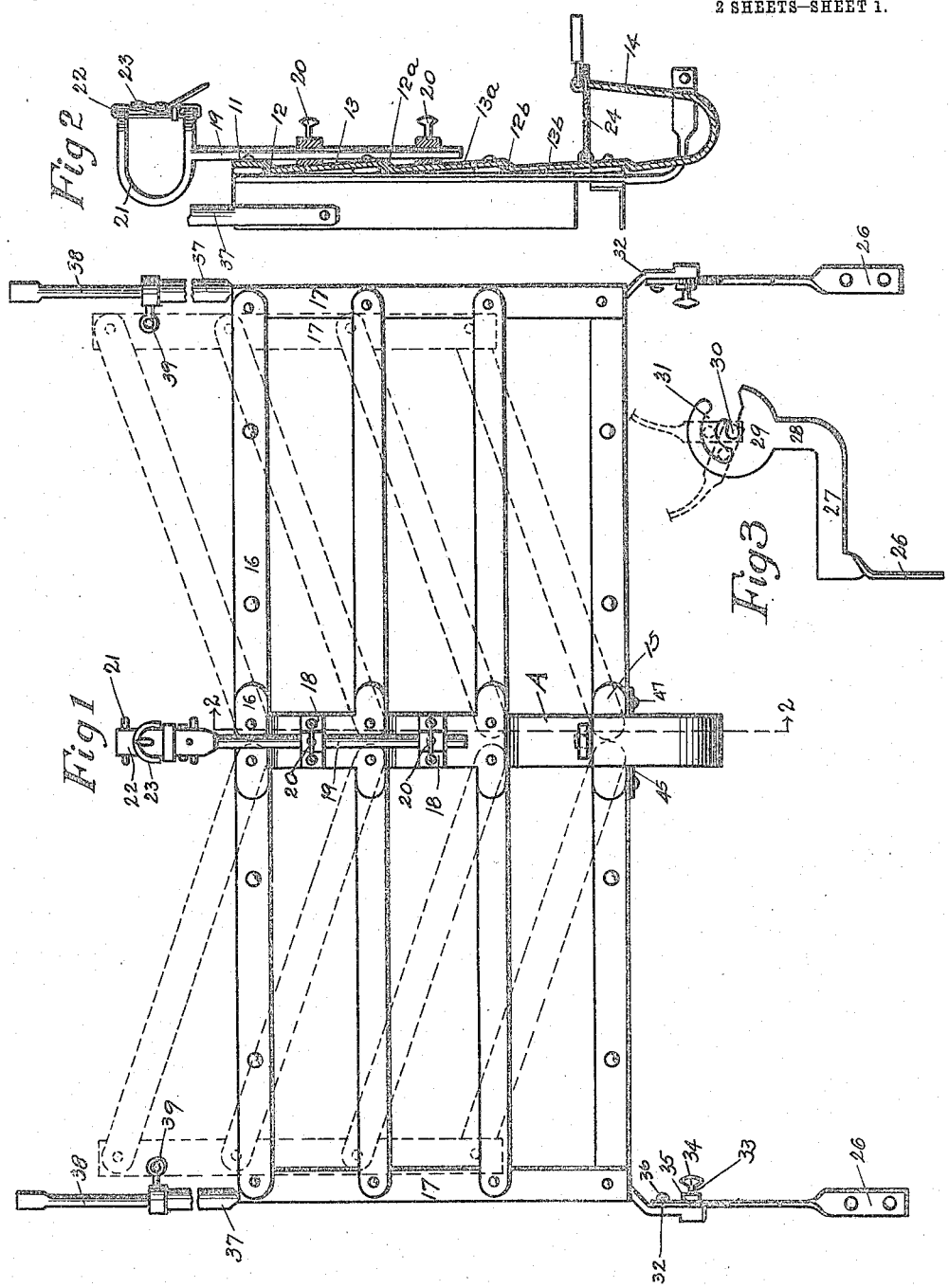

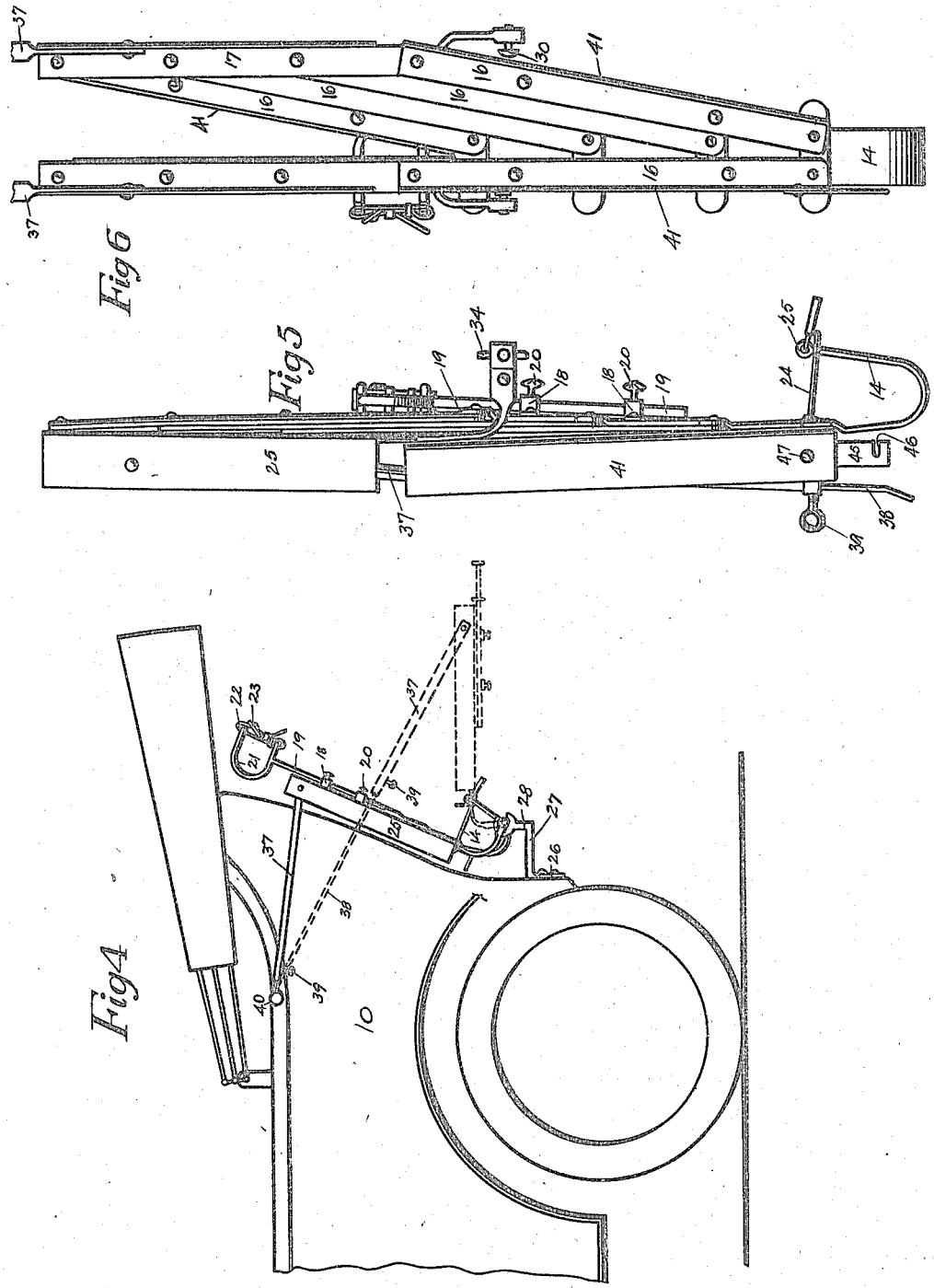

SAMUEL F. GOSS, OF ATLANTIC, IOWA.

FOLDING PACKAGE-CARRIER FOR VEHICLES.

1,135,517.　　　　　Specification of Letters Patent.　　Patented Apr. 13, 1915.

Application filed March 16, 1914.　Serial No. 825,148.

*To all whom it may concern:*

Be it known that I, SAMUEL F. Goss, a citizen of the United States, and resident of Atlantic, in the county of Cass and State of Iowa, have invented a certain new and useful Folding Package-Carrier for Vehicles, of which the following is a specification.

The object of my invention is to provide a folding package carrier for vehicles of simple, durable and inexpensive construction.

More particularly it is my object to provide a folding package carrier of the type mentioned, of peculiar construction, so arranged that the carrier may be folded into a minimum space for storage or transportation when not in use.

Still a further object is to provide such a device having new and novel means for quickly and easily attaching the device to a vehicle or removing it therefrom.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a rear elevation of a carrier in position for installation on a vehicle, the dotted lines showing the position of parts of the carrier in partially folded position. Fig. 2 shows a vertical, sectional view, taken on the line 2—2 of Fig. 1. Fig. 3 shows a detail view of the brackets, the dotted lines showing the coacting engaging devices of the carrier in different positions. Fig. 4 shows a side elevation of a part of a vehicle with my improved carrier installed thereon, the full lines showing the carrier folded against the rear end of the vehicle and the dotted lines showing the carrier in its lowered position, ready for use. Fig. 5 shows a side elevation of the carrier in its folded position, and Fig. 6 shows a rear elevation of the carrier with one side completely folded and the other side partially folded, illustrating the manner in which the movable bottom members of the carrier overlap each other during the folding operation.

In the accompanying drawings I have used the reference numeral 10 to indicate generally the portion of the vehicle shown. For purposes or illustration I have shown the carrier as attached to the back of an automobile. It will be understood that with very slight modifications in construction the carrier could be attached to other vehicles than the kind shown in the drawings.

My carrier consists of the central bar of peculiar construction, which I have indicated in Fig. 1 by the reference character "A". The bar A is constructed with a portion 11 at one end, which in one position of the carrier rests in a vertical plane. Assuming that the portion 11 is in a vertical plane, there is formed integral therewith a portion 12, extending downwardly and away from the portion 11. Formed integral with the portion 12 is a portion 13, extending downwardly toward the vertical plane in which the portion 11 is located. Formed on the lower end of the portion 13 is a portion $12^a$, similar in form and construction to the portion 12. Formed on the lower end of the portion $12^a$ is a portion $13^a$, similar in form and construction to the portion 13. Formed on the lower end of the portion $13^a$ is a portion $12^b$ similar to the portion 12, and formed on the lower end of the portion $12^b$ is a portion $13^b$, similar to the portion 13. Formed on the lower end of the portion $13^b$ is a U shaped device 14, for supporting a tire. Formed on each side of the portion 11 and on each side of the portions 13, $13^a$, $13^b$, at their lower ends, are short lateral extensions 15. Pivoted to the portions 11, 13, $13^a$ and $13^b$ are laterally extending bars 16. The inner ends of the bars 16 are adjacent to each other and are curved as illustrated by the dotted lines in Fig. 1. The outer ends of the members 16, on each side of the central bar A are pivoted to vertical bars 17 in such manner that the bars 16 on each side of the central bar A are parallel with each other. On account of the peculiar step-down construction of the bar A it will be seen that the bars 16 may be folded or collapsed upwardly and toward each other and that the bars 16 on the same side of the bar A move in slightly different planes, which planes are parallel with the planes in which the members 13, $13^a$, $13^b$ and 11 lie. It will therefore be seen that when the bars 16 are folded or collapsed, as shown by the dotted lines in Fig. 1 and by the full lines in Fig. 6, the bars 16 on each side of the central bar 11 will fold over each other, as clearly shown on the right hand side of Fig. 6.

It will thus be seen that when the device is entirely collapsed, the bars 16 on each side of the bar A will rest in vertical planes and will rest each behind the next bar in front, as shown at the right hand side of Fig. 6 and in Fig. 5. Secured to the bar A are a pair of bearings 18, arranged in line with each other, in which is mounted a rod 19. The rod 19 is held in various positions of its movement by means of set screws 20 mounted in bearings 18. The rod 19 extends upwardly beyond the bar A and on its upper end is formed a U shaped device 21, which in one position of the rotation of the bar 19 may be in the same vertical plane as the device 14. Secured to the free ends of the device 21 is a strap 22 having a buckle 23. Pivoted to the portion 13b is a closure device 24, having an opening arranged to receive the free end of the member 14.

Formed on the free end of the member 14 is a ring 25, designed to receive a padlock 26. It will be seen that a tire casing may be mounted in the members 14 and 21 when the carrier is in its upper position, as shown in Fig. 4. The members 17 are formed with upwardly extending flanges 25 at their outer edges. For mounting the carrier upon a vehicle the following means are provided.

Two brackets of similar construction are provided, comprising a vertical plate member 26, the horizontal portion 27 formed thereon, the upwardly extending portion 28 and the plate 29, formed on the upper end of the portion 28. The plate 29 is provided with a slot 30 and with a curved slot 31, curved on the arc of a circle, having its center at the center of the slot 30. The portions 26 of the brackets are designed to be secured to the vehicle 10, as shown in Fig. 4. Secured to the lower ends of the members 17 are arms 32. In the free end of each arm 32 is a bolt 33, having a head 34. On the bolt 33, between the head 34 and the arm 32 is a washer 35. Secured to the arms 32, between the bolts 33 and the members 17 are headed bolts 36. The bolts 36 and 33 are so arranged that the bolt 33 will be received within the slot 30 and the bolt 36 within the slot 31. By screwing the bolt 33 inwardly, the washer 35 will be held against the plate 29 by the head 34 and the arms 32 will be thereby secured to the brackets. By loosening the bolts 33, the carrier may be swung to various positions with relation to the bracket and fastened in its various positions by tightening said bolts.

Pivoted to the flanges 25, near their upper ends, are hollow tubes 37. Slidably mounted in the free ends of the tubes 37 are rods 38 which may be secured in various positions with relation to the tubes 37, by means of set screws 39 mounted in the tubes 37. The ends of the rods 38 are designed to be secured in any suitable manner to the short shafts or rods 40 on the vehicle. The upper and lower bars 16 are provided with flanges 41, similar to the flanges 25, for forming short outer walls for the carrier and thereby better retaining the contents thereof. Pivoted to the flange 41 of one of the lower bars 16, is a short latch bar 45, having a notch 46 in one edge designed to receive a bolt 47 secured to the flange 41 of the other lower bar 16 for locking the carrier in its extended position.

In the practical use of my improved carrier it is installed upon a vehicle in the manner hereinbefore described and when not used for carrying packages or the like may be held in its raised position, as shown in Fig. 4, by loosening the nuts 39, raising the carrier and then screwing the nuts 39 tight. When in its raised position, a casing or complete tire may be mounted in the members 14 and 21 and it will readily be seen that on account of the fact that the rod 19 may be adjusted in the bearings 18 by means of the set screws 20, the members 14 and 21 may be adjusted for holding tires of different sizes. Should it be desired to use the carrier for holding packages, a trunk or the like, the casing need not be removed from the members 14 and 21.

When the carrier is used for holding packages, the set screws 39 are loosened and the carrier is lowered to a horizontal position, as shown by the dotted lines in Fig. 4. The packages may then be strapped to it.

If it is desired to remove the carrier entirely from the vehicle, the set screws 39 are loosened, and by tilting the carrier downwardly to a certain position, after loosening the bolts 33, the bolts 33 and 36 may be removed from the brackets and the carrier may be folded up in the manner hereinbefore described, to a minimum size and placed in the tool box or elsewhere for convenient storage or transportation.

My improved carrier has a number of advantages. It may be quickly and easily installed on a vehicle or removed therefrom and after being installed may be removed from the vehicle without the use of tools and without having any loose parts which are likely to become lost. When in its raised position, as shown in Fig. 4, it is practically out of the way. On account of the peculiar construction of the bar A and the parts connected therewith, the carrier can be folded into a minimum space. The extensions 15 furnish support for the members 16 when they are in their extended position.

It will be understood that my device may be made of any suitable material and of any suitable size and that changes may be made in the details of its construction without departing from its essential features and it is my intention to cover by this application any such changes which may be included within the scope of the following claims.

I claim as my invention:

1. In a device of the class described, a bar having parts successively arranged in different parallel planes, a plurality of members pivoted to the respective parts of the bar in different parallel planes to swing in said planes, to permit said members to swing to collapsed position, resting in substantially superposed position over said bar.

2. In a device of the class described, a bar having parts successively formed in different parallel planes, and a plurality of members pivoted to the respective parts of the bar in different parallel planes to swing in said planes, means for pivotally mounting two corners of said device on a support, and means for mounting the other two corners of the device on a support, said last named means being adjustable for varying the tilted position of the device.

Des Moines, Iowa, February 27, 1914.

SAMUEL F. GOSS.

Witnesses:
C. A. MEREDITH,
J. S. GOSS.